Patented May 27, 1952

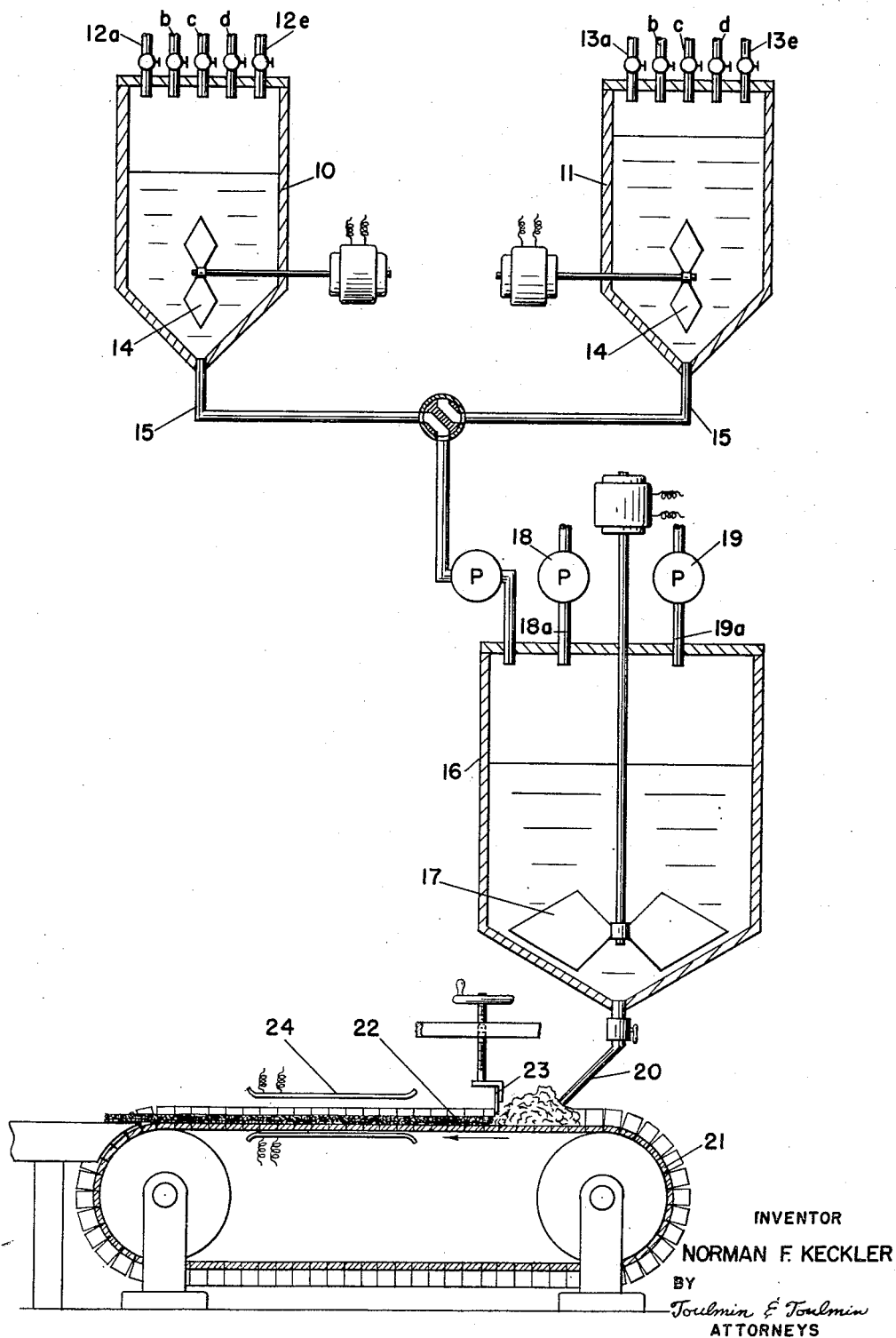

2,598,127

UNITED STATES PATENT OFFICE 2,598,127

METHOD OF PREPARING SPONGE RUBBER AND PRODUCTS PRODUCED THEREBY

Norman F. Keckler, Dayton, Ohio, assignor to The Commonwealth Engineering Company of Ohio, Dayton, Ohio, a corporation of Ohio Application July 21, 1949, Serial No. 105,952

11 Claims. (Cl. 260—2.5)

This invention relates to the processing of rubber. More particularly, it relates to a process for the forming of foam rubber and products thereof. Still more particularly, it relates to rubber products of extremely fine and uniform cellular structure.

Numerous methods of converting dispersions of rubber latex with or without foam stabilizers into foam or froths are in commercial use. These methods incorporate gas cells into the dispersion either by mechanical whipping, by causing the liquid dispersion to absorb gas under pressure and then releasing the pressure, or the release of gas by chemical decomposition.

These frothed latices are used for making dipped, poured or molded articles according to the character of the foam.

One method which has met with limited commercial success derives the gas for frothing the latex from the decomposition of hydrogen peroxide by the enzyme catalase. In this process a latex dispersion is mixed with hydrogen peroxide and catalase and transferred to a mold. When the mold is full of expanded latex foam, the mold is cooled to between 0 and minus 50 degrees F. and the foam frozen. The frozen foam is gelled by introducing carbon dioxide, in the form of a gas, through the frozen foam. The carbon dioxide is absorbed by the frozen latex. The frozen foamed latex is gelled by the acidity of the carbon dioxide.

The principal reason for the limited commercial acceptance of this process has been the high unit cost for refrigeration. Another disadvantage is the slowness of gelling which makes the process a time consuming one.

The above factors of freezing and acidification result in a slow mold turnover and higher costs. The process is limited to molded articles as directed by the freezing and acidification operations.

It is an object of the present invention to overcome the difficulties and disadvantages of the process as explained above.

It is another object of this invention to provide a process wherein the freezing of foamed latex is eliminated.

It is a still further object of this invention to provide a process which is readily adaptable to continuous operation.

It is a still further object of this invention to provide a process wherein quick gelling under controlled conditions is accomplished to maintain collapse of foam structure and loss of volume to a minimum.

It is still another object of this invention to provide a process wherein gelling of foam by surface treatment with weak acid is eliminated and the gelling accomplished upon the heels of expansion.

It is another object of the present invention to provide a foam which is stable without refrigeration and is vulcanizable without destroying the foam structure.

Another object of the present invention is to provide a process wherein the combination of addition agents provide controlled setting of gas inflated foam.

Still another object of this invention is to provide a process wherein the heat of reaction of the gas generating process speeds up the gelling reaction so that foam starts setting soon after formation.

It is another object of the present invention to provide a process wherein all foaming and gelling reagents are compatible and operate by way of reaction within the foam to give effective results not accomplished with surface treating agents.

Various other objects and advantages will become apparent to one skilled in the art as the following description proceeds.

In accordance with this invention, a dispersion of a rubber or a rubber-like latex is mixed with a stabilizer and the pH of the solution lowered to near neutrality. To the heat sensitive, lowered pH latex solution is added a vulcanizing dispersion consisting of one or more of such materials as accelerators, anti-oxidants, vulcanizing agents, activators, softeners, fillers and organic ethers which effect delayed gelling of the latex.

The heat sensitive latex is mixed with a solution of soluble peroxide and an enzyme which rapidly decomposes the peroxide. The mixing operation requires that the peroxide and enzyme be uniformly dispersed in the latex solution in order to obtain a uniform sponge. The gas released from the peroxide decomposition is entrapped and foams the latex compound. The heat released by the exothermic reaction of peroxide decomposition and additional external heat will gel the foamed latex.

Foams of this formulation quickly attain such stability that they can be cured without freezing the foam to cause it to hold its cellular structure against shrinkage and loss of volume.

Organic ether of the type useful as delayed coagulant for a rubber dispersion is illustrated by polyvinyl methyl ether. This ether may be added to the mixture of a rubber latex and foaming agents in quantities of from approximately 1 to 20 parts per 100 parts of latex solids in the dispersion with the preferred amount being about 4 parts per hundred parts of latex.

Aqueous polyvinyl methyl ether solutions have unique solubility characteristics. Polyvinyl methyl ether is soluble in cold water and precipitates out of water solutions when heated to about 35 degrees C.

The above latex dispersion is in a metastable state. It is heat sensitive in that it will coagulate when heated to a specific temperature, hereafter referred to as the coagulation temperature. The coagulation temperature may drop from 0 to 20 degrees C. after aging the latex compound for 24 hours.

The coagulation temperature of a latex dispersion is affected by several factors. These factors are the concentration and type of stabilizer, the type of latex dispersed, pH of the latex composition, polyvinyl methyl ether content, total solids content, and variables of the vulcanizing dispersion.

Polyvalent metal oxides cooperate with the ethers to form fast gelling or coagulating combinations. Thus, for example, beryllium, magnesium, zinc, cadmium and barium oxides may be added to enhance the gelling effect. The oxides are added in quantities to constitute from 1 to 3% by weight of the mixture.

Following gelation, the foam structure is cured by application of heat. The unexpected result of the proper choice latex dispersion formulation is that the oxygen inflated foam may be vulcanized or cured while standing in the room atmosphere and that the foam is sufficiently stable to hold its cellular structure while being subjected to heat.

Thus, the foam can be cured without freezing to stabilize and maintain the cellular structure against shrinkage and loss of volume. The gelling operation may become a part of the curing operation.

Natural, as well as synthetic rubbers, or their mixtures are applicable for this invention. Thus, the term dispersion is to be understood to mean any dispersion of a rubber and rubber-like substances, including synthetic, reclaim, partially prevulcanized, and natural rubbers in a colloidal suspension form. Polychloroprene, butadiene polymers, as for example, butadiene-styrene, butadiene acrylonitrile polymers, polyvinyl chloride, and other equivalent latices have been found especially satisfactory.

Soluble peroxides present in the rubber dispersions are attacked by the enzyme and decompose in an exothermic reaction.

Example of the soluble peroxide is hydrogen peroxide. Concentrated solutions are used to avoid dilution of the latex compound.

In general, quantities of peroxide ranging from 1 to 20% by weight and quantities of enzyme varying from .5% to 2% have proven satisfactory.

An enzyme capable of decomposing hydrogen peroxide is catalase. Commercial yeast contains a high percentage of catalase and may be used to decompose hydrogen peroxide.

The density of the product is controlled by the amount of peroxide employed. The concentration of enzyme is such that total decomposition of peroxide is obtained.

Inasmuch, as the foams are to be vulcanized, numerous agents are intimately mixed into the dispersion, preferably before foaming.

Such agents are, for illustrative purposes, activators or accelerators for the curing operation, for example, zinc diethyl dithio carbamate, zinc salt of 2 mercapto benzothiazole, and equivalent products.

Also, such strong antioxidants are required due to the large surface area of the sponge, as for example, di - beta - naphthyl-para-phenylene-diamine.

For fast curing, sulfur is quite often added in addition to the other agents.

The action of the above described reagents is in no way hampered by addition of foam stability agents, as for example, the soaps.

Another stability agent is sodium silicate which is added generally in quantities of approximately 2 to 2½% by weight.

The temperature of vulcanization depends upon the type of rubber, its accelerators, and so forth. The time for vulcanization likewise varies. The problem involved in its solution is well known in the rubber industry and needs no description here, except that an oven temperature of from 200 to 250 degrees F. has been found satisfactory.

Curing may be effected by placing the foam in molds and immersing the molds in hot water or in steam, or the foam may be treated in the atmosphere by such methods as application of infra red and dielectric heating.

The length of time for heat treatment varies greatly, depending upon such factors as thickness of the foam and the like.

One form of apparatus whereby mixing, expanding and curing operations may be carried out continuously is illustrated in the single figure of the drawing, which is a flow sheet.

As illustrated, the dispersion of rubber is received alternately in mixing tanks 10 and 11 delivered through lines 12a and 13a, respectively. The desired amounts of additional ingredients, such as the sensitizer, the acid for pH adjustment, the vulcanizing dispersion and the latex stabilizer, are delivered through line 12b, c, d and e, and 13b, c, d and e, respectively, from common sources. Thorough mixing is accomplished in tank 10 by use of an agitator 14, such as a lightning mixer.

When the mixing is complete in tank 10, for example, the solution is directed at a predetermined flow rate as by a pump through outlet conduit 15 to the mixer 16. In mixer 16, the mixture is agitated by agitator 17 while proper amount of peroxide solution and yeast solution are continuously metered as by pumps 18 and 19 into the mixer 16 through lines 18a and 19a, respectively.

The liquid material discharged from the outlet 20 of mixer 16 is deposited in a foaming condition due to liberation of gasses upon a continuously moving belt 21. The depth of the foam layer 22 is limited by a doctor blade 23. The foam layer 22 is moved by the belts under the heating units 24 consisting of induction heating plates.

The invention is further illustrated by the following examples which are given by way of illustration and not by way of limitation:

More specifically, than heretofore given, a dispersion of synthetic latex, butadiene-styrene polymer, may be rendered heat sensitive by adding a stabilizer, for example, polyethylene glycol oleyl ether in amounts from 0.1 to 3.0 parts per 100 parts of latex solids, with amounts in the range of 1 to 1.5 per 100 of latex preferred. The latex is agitated during all additions to prevent localized coagulation.

The pH of the latex solution is lowered to near neutrality by the addition of dilute acid. Two normal sulphuric acid is satisfactory although other acids may be used. Formaldehyde may be used to neutralize the excess ammonia in the latex.

An aqueous vulcanizing dispersion is then added to the latex solution. The vulcanizing dispersion may consist of accelerators, antioxidants, vulcanizing agents, activators, softeners and fillers. It is common practice to ball mill the vulcanizing dispersion from 24 to 48 hours.

An aqueous solution of polyvinyl methyl ether is added in amounts from ½ to 20 parts per 100 parts of latex solids. The dispersion is then foamed by means of gas freed by the peroxide decomposition reaction.

A detailed formulation to illustrate a heat sensitive latex composition is as follows:

Example I

|  | Dry Parts | Wet Parts |
|---|---|---|
| Natural Creamed Latex (67.64% solids) (10.3) | 100.0 | 148.0 |
| 25% Polyethylene Glycol Ether Solution (10.3) | 1.2 | 4.8 |
| 2 Normal Solution of Sulfuric Acid: |  |  |
| Volume vs. pH |  |  |
| 3.0 ml. (9.82) |  |  |
| 5.0 ml. (9.65) |  |  |
| 8.0 ml. (9.42) |  |  |
| 10.0 ml. (9.26) |  |  |
| 12.0 ml. (9.0) |  |  |
| 14.0 ml. (8.85) |  |  |
| 16.0 ml. (8.5) |  |  |
| 19.0 ml. (7.05) |  |  |
| Vulcanizing Dispersion | (8.0) | 20.15 (16.0) |
| Zinc Oxide | 3.0 | 3.0 |
| Sulfur | 2.0 | 2.0 |
| Sym.-Di-beta-naphthyl-para phenylenediamine | 1.0 | 1.0 |
| Zinc Diethyl-dithiocarbamate | 1.0 | 1.0 |
| Zinc salt of 2-mercaptobenzothiazole | 1.0 | 1.0 |
| Sodium salts of polymerized alkylaryl sulfonic acid | 0.24 | 0.24 |
| Casein | 0.12 | 0.12 |
| Caustic Soda | 0.10 | 0.10 |
| Water (7.6) |  | 7.54 |
| 25% Polyvinyl Methyl Ether (7.7) |  | 16.0 |
| 60% Carbon Black Dispersion (7.8) | 0.25 | 0.42 |
| Total | 113.91 | 205.37 |

The latex was agitated during all the additions. Numbers in the brackets are pH values at the indicated stage of formulating the latex compound and the pH of the compounded latex was 7.8. A coagulation temperature of 55 degrees C. was determined for the heat sensitive latex compound.

A sample of latex sponge was made from the heat sensitive latex mixture as follows:

308 grams of the above described heat sensitive latex compound was weighed in a glass vessel;

4.0 ml. of a 40% commercial yeast solution was intimately mixed with the compounded latex;

Addition of 8.0 ml. of 130 volume hydrogen peroxide followed by slow mixing for about half of a minute.

The solution was poured into molds and in the back of small sections of floor carpets. The samples were placed in 110 degrees C. forced air circulation type of air ovens for 90 minutes. Other samples were placed in a 5-pound steam chamber for 30 minutes. The samples of sponge possessed small, uniform cell structure and had good resilience.

Example II 237.0 parts butadiene-styrene latex (approximately 50% solids)
15.0 parts 20% ammonia oleate emulsion
9.0 parts 50% Sunoco's Circo oil emulsion
2.5 parts 15% ammonia caseinate solution
4.1 parts 73% sulfur dispersion
2.8 parts 55% di-beta-naphthyl-para-phenylene diamine dispersion
2.8 parts 55% zinc diethyl-dithio carbamate dispersion
2.8 parts 55% zinc salt of 2-mercaptobenzothiazole dispersion The above formulation was compounded as a master batch. The following compounds were added at the foaming process:

9.0 parts 50% zinc oxide dispersion
6.0 parts 40% Fleischman's yeast solution
4.0 parts polyvinyl methyl ether
15.0 parts 130 volume hydrogen peroxide solution The additions were made in the above order with agitation. At the end of mixing the dispersion was at room temperature of approximately 23 degrees C. Approximately 5 volumes of foam are obtained from each unit weight of the above formulation. The foamed latex may be cured in one hour at 110 degrees C. in an air oven. Such a foam is highly uniform in porosity and sets with little loss of volume during the curing.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. In a method of making sponge rubber, the steps of mixing at approximately room temperature an aqueous dispersion of a rubber latex, a stabilizer, an acid in quantity lowering the pH of the dispersion to approximately neutrality, a peroxide soluble in aqueous mediums, a peroxide decomposing enzyme, and a polyvinyl methyl ether, expanding the mixture to cellular structure foam by the gas liberated through the enzyme reaction, gelling the foam through the action of gelling agents at temperatures above 35° C., and vulcanizing the foam by heating.

2. In a method of making sponge rubber, the steps of mixing with an aqueous rubber dispersion with pH adjusted to approximately neutrality, polyvinyl methyl ether, a polyvalent metal oxide to the extent of between about 1 to 3% on the weight of the latex, hydrogen peroxide and a peroxide decomposing enzyme, expanding the mixture to a cellular structure foam by the gas liberated through the enzyme reaction, coagulating the foam through the action of polyvinyl methyl ether at temperatures above 35° C., and vulcanizing the foam by heating.

3. In a method of making sponge rubber, the steps of mixing at approximately room temperature an aqueous dispersion of a rubber latex, 1 to 3% by weight of a polyvalent metal oxide, 1 to 20% by weight of a peroxide solution, .5 to 5% by weight of a peroxide decomposing enzyme, .5 to 5% by weight of a polyvinyl methyl ether, expanding the mixture to a cellular structure foam by the gas liberated through the enzyme reaction, gelling the foam through the action of the ether at temperatures above 35° C., and vulcanizing the foam by heating.

4. In a method of making sponge rubber, the steps of mixing at approximately room temperature an aqueous dispersion of a rubber latex, 1 to 3% by weight of a polyvalent metal oxide, 1 to 20% by weight of a peroxide solution, .5 to 5% by weight of a peroxide decomposing enzyme, .5 to 5% by weight of a polyvinyl methyl ether, expanding the mixture to a cellular structure foam by the gas liberated through the enzyme reaction, gelling the foam through the action of the ether at temperatures above 35° C., and curing the mixture to a temperature in the range of 200 to 250° F.

5. In a method of making sponge rubber, the steps of mixing at approximately room temperature an aqueous dispersion of a rubber latex, hydrogen peroxide, a peroxide decomposing enzyme, ammonia oleate emulsion, and sufficient 2 normal sulfuric acid to bring the dispersion to approximately neutrality, and polyvinyl methyl ether, expanding the mixture to a cellular structure foam by the gas liberated through the enzyme reaction, gelling the foam through the action of the polyvinyl methyl ether at temperatures above 35° C., and vulcanizing the foam by heating.

6. In a method of making sponge rubber, the steps of mixing at approximately room temperature an aqueous dispersion of a rubber latex, a peroxide soluble in aqueous mediums, a peroxide decomposing enzyme catalase, polyvinyl methyl ether and sodium silicate solution, expanding the mixture to a cellular structure foam by the gas liberated through the enzyme reaction, gelling the foam through the action of the polyvinyl methyl ether at temperatures above 35° C., and vulcanizing the foam by heating.

7. In a method of making sponge rubber, the steps of mixing at approximately room temperature an aqueous dispersion of a rubber latex, a peroxide soluble in aqueous mediums, baker's yeast, and polyvinyl methyl ether, expanding the mixture to a cellular structure foam by the gas liberated through the enzyme reaction, gelling the foam through the action of the polyvinyl methyl ether at temperatures above 35° C., and vulcanizing the foam by heating.

8. In a method of making sponge rubber, the steps of mixing at approximately room temperature an aqueous dispersion of synthetic rubber latex, hydrogen peroxide, baker's yeast, 1 to 3% by weight on the latex of a polyvalent metal oxide and polyvinyl methyl ether, expanding the mixture to a cellular structure foam by the gas liberated through the enzyme reaction, gelling the foam through the action of the polyvinyl methyl ether at temperatures above 35° C., and vulcanizing the foam by heating.

9. In a method of making sponge rubber, the steps of mixing at approximately room temperature an aqueous dispersion of butadiene-styrene latex, hydrogen peroxide, baker's yeast, 1 to 3% by weight on the latex of a polyvalent metal oxide and polyvinyl methyl ether, expanding the mixture to a cellular structure foam by the gas liberated through the enzyme reaction, gelling the foam through the action of the polyvinyl methyl ether at temperatures above 35° C., and vulcanizing the foam by heating.

10. In a method of making sponge rubber, the steps of mixing at approximately room temperature an aqueous dispersion of natural rubber latex, hydrogen peroxide, baker's yeast, 1 to 3% by weight on the latex of a polyvalent metal oxide and polyvinyl methyl ether, expanding the mixture to a cellular structure foam by the gas liberated through the enzyme reaction, gelling the foam through the action of the polyvinyl methyl ether at temperatures above 35° C., and vulcanizing the foam by heating.

11. In a method of making sponge rubber, the steps of mixing at approximately room temperature an aqueous dispersion of a rubber latex, 1 to 20% by weight of a peroxide solution, .5 to 5% by weight of peroxide decomposing enzyme, 0.5 to 5% by weight of polyvinyl methyl ether, 1 to 3% by weight on the latex of a polyvalent metal oxide, expanding the mixture to a cellular structure foam by the gas liberated through the enzyme reaction, coagulating the foam through heating to a temperature in the range of 100 to 150° F., and vulcanizing the foam.

NORMAN F. KECKLER.

REFERENCES CITED

The following references are of record in the file of this patent:

UNITED STATES PATENTS

| Number | Name | Date |
|---|---|---|
| 2,138,081 | Wolf | Nov. 29, 1938 |
| 2,321,111 | Stamberger | June 8, 1943 |
| 2,323,119 | Clayton | June 29, 1943 |
| 2,432,353 | Talalay | Dec. 9, 1947 |
| 2,444,869 | Clayton et al. | July 6, 1948 |
| 2,469,894 | Rogers | May 10, 1949 |
| 2,540,040 | Baker | Jan. 30, 1951 |

FOREIGN PATENTS

| Number | Country | Date |
|---|---|---|
| 420,912 | Great Britain | Dec. 6, 1934 |
| 484,616 | Great Britain | May 9, 1938 |
| 574,131 | Great Britain | Dec. 21, 1945 |

OTHER REFERENCES

Chemical and Engineering News, June 16, 1947, page 1747.

P. B. Report 32,161, I. G. Central Rubber Organization at Leverkusen, pub. by Combined Intelligence Objective Subcommittee, London, appendix V, pages 1, 2, 23–28, 48–53.

B. I. O. S. Report No. 7, "Rubber Industry in Germany 1939–1945," page 18.